United States Patent
Behnke

(10) Patent No.: US 8,377,502 B2
(45) Date of Patent: Feb. 19, 2013

(54) METHOD FOR INSTALLING FUNCTION MONITORING MEANS IN A FLOW MACHINE INSTALLATION

(75) Inventor: Klaus Behnke, Schriesheim (DE)

(73) Assignee: MAN Diesel & Turbo SE, Augsburg (DE)

( * ) Notice: Subject to any disclaimer, the term of this patent is extended or adjusted under 35 U.S.C. 154(b) by 185 days.

(21) Appl. No.: 12/839,737

(22) Filed: Jul. 20, 2010

(65) Prior Publication Data

US 2011/0020543 A1    Jan. 27, 2011

(30) Foreign Application Priority Data

Jul. 25, 2009    (DE) .......................... 10 2009 034 796

(51) Int. Cl.
*B05D 5/06* (2006.01)
*G01K 11/12* (2006.01)

(52) U.S. Cl. .............. 427/8; 427/402; 374/162
(58) Field of Classification Search .............. 427/8, 402; 374/159, 161, 162; 118/DIG. 11
See application file for complete search history.

(56) References Cited

U.S. PATENT DOCUMENTS

| | | | | |
|---|---|---|---|---|
| 4,121,011 A | * | 10/1978 | Glover et al. ................. | 428/347 |
| 6,153,889 A | * | 11/2000 | Jones ....................... | 250/559.45 |

FOREIGN PATENT DOCUMENTS

| | | |
|---|---|---|
| DE | 826 205 | 12/1951 |
| DE | 195 37 999 | 4/1997 |
| DE | 199 36 268 | 6/2001 |
| DE | 10 2004 029 356 | 2/2006 |
| DE | 10 2005 047 739 | 2/2007 |
| EP | 0 947 813 | 10/1999 |

OTHER PUBLICATIONS

Gunnerson et al., "Visualizing the thermal performance of heat pipes with thermochromic liquid crystals," INCEC '91: Proceedings of the 26th Intersociety Energy Conversion Engineering Conference, Boston, MA, Aug. 4-9, 1991. vol. 4 (A92-50746 21-44). La Grange Park, IL, american Nuclear Society, 1991, p. 296-299. Abstract.*
Sun et al., "Measurement of temperature distribution of a flat-plate heat pipe using thermochromic liquid crystal and color changing techniques," ASME Heat Transfer Div Publ Htd. vol. 361-5, pp. 555-560. 1998. Abstract.*
Igarashi et al., "Experimental Study on Fluid Mixing for Evaluation of Thermal Striping in T-Pipe Junction," ICONE-10: 10. International Conference on Nuclear Engineering, Arlington, VA, Apr. 14-18, 2002. Abstract.*
EPO machine translation of DE 826205.*

* cited by examiner

*Primary Examiner* — William Phillip Fletcher, III
(74) *Attorney, Agent, or Firm* — Cozen O'Connor

(57) ABSTRACT

A method for installing function monitoring means in a flow machine installation, wherein the function monitoring means are formed by at least one thermochromic paint, and wherein the method comprises: selecting at least one component of the flow machine installation whose function is to be monitored; selecting a predetermined thermochromic paint for the component whose function is to be monitored; applying the thermochromic paint on the component whose function is to be monitored; and wherein the thermochromic paint is applied to at least one component of the flow machine installation, which component is to be monitored with respect to the through-flow of process fluid therein.

6 Claims, 1 Drawing Sheet

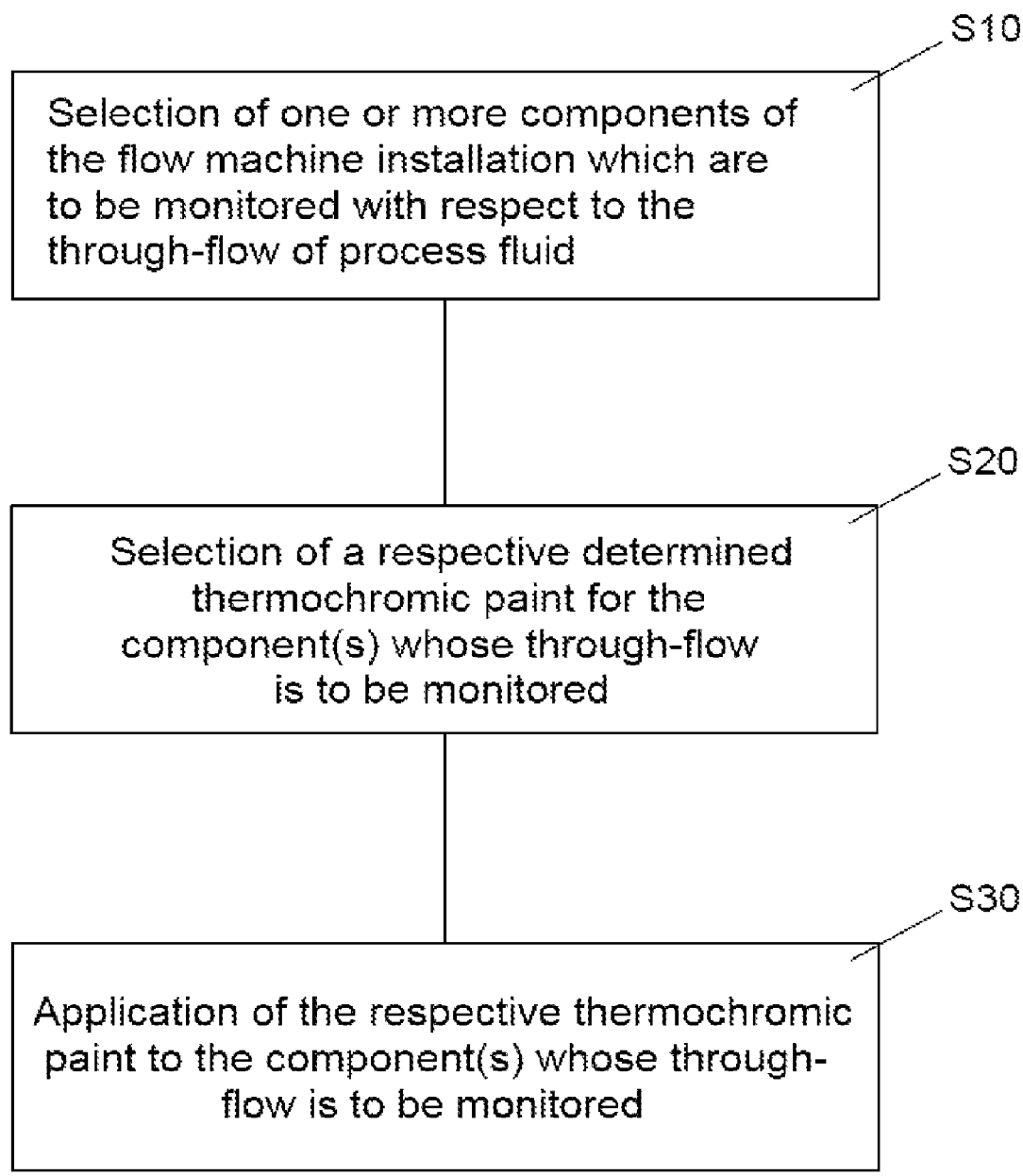

METHOD FOR INSTALLING FUNCTION MONITORING MEANS IN A FLOW MACHINE INSTALLATION

BACKGROUND OF THE INVENTION

1. Field of the Invention

The invention is directed to a method for installing function monitoring means in a flow machine installation.

2. Description of the Related Art

From DE 10 2005 047 739 B3 it is known that turbine blades of a flow machine installation which is constructed as a steam turbine be furnished with a coating provided with encapsulated nanoparticles which changes color when a predetermined limit temperature is exceeded.

It is known from EP 0 947 813 B1 and DE 195 37 999 A1 to use thermochromic paint for the development of high-temperature components of turbines and combustion chambers.

It is known from DE 10 2004 029 356 A1 to provide an installation such as, e.g., a tube furnace or a vacuum furnace with thermochromic visualization means for monitoring temperature.

It is known from DE 199 36 268 C1 to accomplish detection of damage in machinery having a machine part which heats up in case of damage by providing a coating comprising a temperature change color in the area of every machine part to be monitored at least at one location which can be viewed by visual inspection.

It is known from DE 826 205 C to use temperature-dependent coatings for the optical display or monitoring of temperatures, e.g., in machine bearings.

All of the solutions known from the prior art, particularly also the solution proposed in DE 10 2005 047 739 B3, have the disadvantage that they aim at monitoring temperature in a relatively limited spatial area and do not offer the possibility of realizing a function monitoring of components of flow machine installations carrying process fluid, particularly components of flow machine installations which extend over large areas.

Flow machine installations generally have many components which carry process fluid and which have corresponding connections such as, e.g., complicated and extensive pipeline systems. The components carrying process fluid sometimes transport hazardous materials such as, e.g., steam under pressure or hot gases. Accordingly, for the operation and maintenance of flow machine installations it is necessary to be informed about the operating state of the respective components carrying process fluid. For example, maintenance personnel can be severely injured when inadvertently opening flange connections of a steam pipeline (as an example of a component carrying process fluid) which is under pressure. Operators can also be burned by touching piping not known to be hot.

Further, the operating performance and lifetime of the flow machine installation can be considerably impaired by fluid flows or interruptions in the fluid flow which are incompatible with the plant technology.

SUMMARY OF THE INVENTION

Accordingly, it is an object of the present invention to provide a method, wherein the function monitoring means are provided in the flow machine installation in such a way as to ensure a simple, fast and inexpensive function monitoring of components carrying process fluid.

According to the present invention, a method is provided for installing function monitoring means in a flow machine installation, wherein the function monitoring means are formed by at least one thermochromic coating, and wherein the method comprises: selecting of at least one component of the flow machine installation whose function is to be monitored, selecting of a predetermined thermochromic coating for the component whose function is to be monitored, and applying the thermochromic coating on the component whose function is to be monitored. The method according to the present invention further comprises using thermochromic paint as the thermochromic coating, and applying the thermochromic paint to at least one component of the flow machine installation, which component is to be monitored with respect to the through-flow of process fluid therein.

By providing thermochromic paint on one or more components of the flow machine installation which are to be monitored with respect to the through-flow of process fluid therein, function monitoring means are realized in the flow machine installation by means of which operating states such as, e.g., fluid flow or the absence of fluid flow or fluid leaks or leakiness of the respective component can be predetermined in a fast, simple, safe and economical manner. According to the invention, no additional measuring transducers or opening of the components carrying process fluid are necessary for determining the operating state. This economizes on labor time and, therefore, on costs and reduces the risk of injury to operators and maintenance personnel of the installation to a substantial extent.

On the one hand, owing to the reliable determination of the operating state of the components of the flow machine installation which carry process fluid, industrial accidents can be prevented more reliably because operators of the flow machine installation can see, even without access to a respective component carrying process fluid, whether or not fluid, e.g., steam, is flowing through this component and, therefore, whether or not this component is very hot or, e.g., leaky.

On the other hand, the operating performance of the flow machine installation can also be improved and the lifetime of the flow machine installation can be prolonged with the method according to the invention because impermissible fluid flows or the absence of fluid flows can be visually detected easily and quickly by operators of the flow machine installation. In this way, for example, unwanted increases in pressure or drops in pressure or unwanted increases or decreases in temperature which could lead to reduced operating performance and/or reduced lifetime of the flow machine installation can be prevented.

Thermochromic paint can be configured and selected in such a way that it changes color when reaching or exceeding a predetermined temperature so that a change in temperature of the component carrying process fluid can be predetermined simply by visual inspection of a process fluid-carrying component which is coated with the thermochromic paint.

Thermochromic paints make use of the thermochromic effect exhibited by certain substances which change color when heated due to changes in their crystallic structure. This process can be reversible or irreversible depending on the composition of the thermochromic paint.

According to the invention, components carrying process fluid are any components provided for conveying a process fluid or work fluid such as, e.g., steam, compressed or expanded gas, etc., such as, e.g., process fluid lines (pipes, hoses, etc.) or housing parts of a flow machine such as a turbine which carry process fluid, namely, for example, a flange area or flange connections to a turbine housing. Accordingly, flow machine installations include any flow machine or turbomachinery such as, e.g., a turbine, a compressor, an expander, etc., either by itself or in combination with other machinery.

According to an embodiment of the method according to the invention, a steam turbine installation is selected as a flow machine installation. The thermochromic paint is preferably applied to at least one pipeline as a component to be monitored with respect to the through-flow of a process fluid therein.

By providing thermochromic paint on the outer circumference of one or more pipelines of the steam turbine installation, function monitoring means are realized in the steam turbine installation by means of which operating states such as, e.g., fluid flow or the absence of fluid flow or even blockage of the respective pipeline can be predetermined in a fast, simple, safe and economical manner. According to the invention, no additional measuring transducers or opening of the pipeline(s) are necessary for determining the operating state. This economizes on labor time and, therefore, on costs and reduces the risk of injury to operators and maintenance personnel of the installation to a substantial extent.

On the one hand, owing to the reliable determination of the operating state of the pipeline(s) of the steam turbine installation, industrial accidents can be prevented more reliably because operators of the steam turbine installation can see, even without access to a respective pipeline, whether or not fluid, e.g., steam, is flowing through this pipeline and, therefore, whether or not this pipeline is very hot. On the other hand, the operating performance of the steam turbine installation can also be improved and the lifetime of the steam turbine installation can be prolonged with the method according to the invention because impermissible fluid flows or the absence of fluid flows can be visually detected easily and quickly by operators of the steam turbine installation. In this way, for example, unwanted increases in pressure or drops in pressure or unwanted increases or decreases in temperature which could lead to reduced operating performance and/or reduced lifetime of the steam turbine installation can be prevented According to an embodiment of the method according to the invention, at least one monitoring portion of the pipeline whose through-flow is to be monitored is selected before applying the thermochromic paint, wherein the thermochromic paint is applied exclusively to the at least one monitoring portion.

By specifically selecting one or more monitoring portions to be provided with thermochromic paint, the function monitoring can be optimized with respect to the plant technology and the visual accessibility of the monitoring portions on the one hand. On the other hand, by applying thermochromic paint only to the monitoring portion or monitoring portions, thermochromic paint and, therefore, costs can be economized to a great extent.

According to another embodiment of the method according to the invention, at least one monitoring portion is selected which is located directly adjacent to a shut-off device installed in the pipeline.

Accordingly, with knowledge of a reference switching state of the shut-off device and by taking into account an operating state of the pipeline (through-flow or absence of through-flow) which can be detected by viewing the thermochromic paint, the tightness and functionality of the shut-off device can be assessed. In this way, for example, slow leaks can be quickly detected.

According to another embodiment of the method according to the invention, the at least one thermochromic paint is selected from a group of thermochromic paints, wherein the group of thermochromic paints comprises thermochromic paints which react in different temperature ranges.

In this way, it is possible to use different colors with a temperature range adapted to the respective process fluid or with a reaction temperature adapted to the respective process fluid for different process fluids such as, e.g., water vapor, cooling water, oil, etc. In this way, the operating state of the respective pipeline or component carrying process fluid can be predetermined even faster and more reliably.

According to an embodiment of the method according to the invention, thermochromic paint is applied to at least one steam pipeline and/or at least one drain pipeline of the steam turbine installation.

With the steam pipelines, pipelines which are very critical, e.g., with respect to the operation and safety of the steam turbine installation can be monitored simply and safely.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be described more fully in the following with reference to preferred embodiment and the accompanying drawing, in which:

FIG. 1 is a flow chart illustrating a method for installing function monitoring means in a flow machine installation according to an embodiment of the invention.

DETAILED DESCRIPTION OF THE PRESENTLY PREFERRED EMBODIMENTS

FIG. 1 shows in the most general and simplest form a flow chart for a method according to the invention for installing function monitoring means in a flow machine installation which is constructed in the present case as a steam turbine installation, wherein the function monitoring means are formed by at least one thermochromic coating in the form of thermochromic paint.

According to FIG. 1, at least one pipeline which is to be monitored with respect to its through-flow of a process fluid is selected in step S10 as a component of the steam turbine installation. Preferably steam pipelines and drain pipelines of the steam turbine installation are considered as such components.

In a preferred next step S20, a predetermined thermochromic paint is selected for the respective pipeline whose through-flow is to be monitored.

According to an embodiment of the invention not shown in FIG. 1, the thermochromic paint can be selected from a group of thermochromic paints which includes thermochromic paints of different hues or primary colors which react in different temperature ranges or which have different color change temperatures.

According to another embodiment of the invention not shown in FIG. 1, predetermined monitoring portions are selected at the pipeline(s) whose through-flow is to be monitored prior to the application of the thermochromic paint. These are preferably portions of the respective pipeline(s) which are located directly adjacent to a shut-off device installed in the respective pipeline.

In a next step S30, the respective thermochromic paint(s) is/are then applied to the pipeline(s) whose through-flow is to be monitored, wherein the thermochromic paint is applied exclusively to the selected monitoring portion(s).

A quick visual inspection of, e.g., steam pipelines and/or drainage pipelines connected to the steam turbine is now possible. In this way, the operating state of the respective pipeline through which steam flows, for example, can be quickly visually inspected. Accordingly, an assessment of, e.g., blocked drainage pipelines or leaky shut-off devices is possible safely and quickly without additional measuring transducers. The thermochromic paint which is applied to pipelines according to the invention changes color when a limit temperature or reaction temperature specific to the respective thermochromic paint is reached and/or exceeded so that the operating state of the respective pipeline (which is hot, for example, because steam is flowing through it) can be immediately predetermined in a simple and inexpensive manner. Slow leaks, for example, can also be quickly predetermined in this way.

The invention is not limited by the embodiments described above which are presented as examples only but can be modified in various ways within the scope of protection defined by the appended patent claims.

I claim:

1. A method for installing temperature monitoring means in a steam turbine installation, wherein the temperature monitoring means are formed by at least one thermochromic coating, the method comprising: selecting at least one component of the steam turbine installation whose temperature is to be monitored; selecting a predetermined thermochromic coating for the component whose temperature is to be monitored; applying the thermochromic coating on the component whose temperature is to be monitored; using the thermochromic paint as thermochromic coating; and applying the thermochromic paint to at least one component of the steam turbine installation, which component is to be monitored with respect to the through-flow of process fluid therein.

2. The method according to claim 1, wherein the thermochromic paint is applied to at least one pipeline as the component to be monitored with respect to the through-flow of a process fluid therein.

3. The method according to claim 2, wherein at least one monitoring portion is selected at the pipeline whose through-flow is to be monitored before applying the thermochromic paint, and wherein the thermochromic paint is applied exclusively to the at least one monitoring portion.

4. The method according to claim 3, wherein at least one monitoring portion is selected which is located directly adjacent to a shut-off device installed in the pipeline.

5. The method according to claim 1, wherein thermochromic paint is applied to at least one of a steam pipeline and one drainage pipeline of the steam turbine installation.

6. The method according to claim 1, wherein the at least one thermochromic paint is selected from a group of thermochromic paints which exhibit different colors in different temperature ranges.

* * * * *